Aug. 6, 1929.    J. C. McCUNE    1,723,192
CAR DOOR INTERLOCK
Filed May 19, 1928
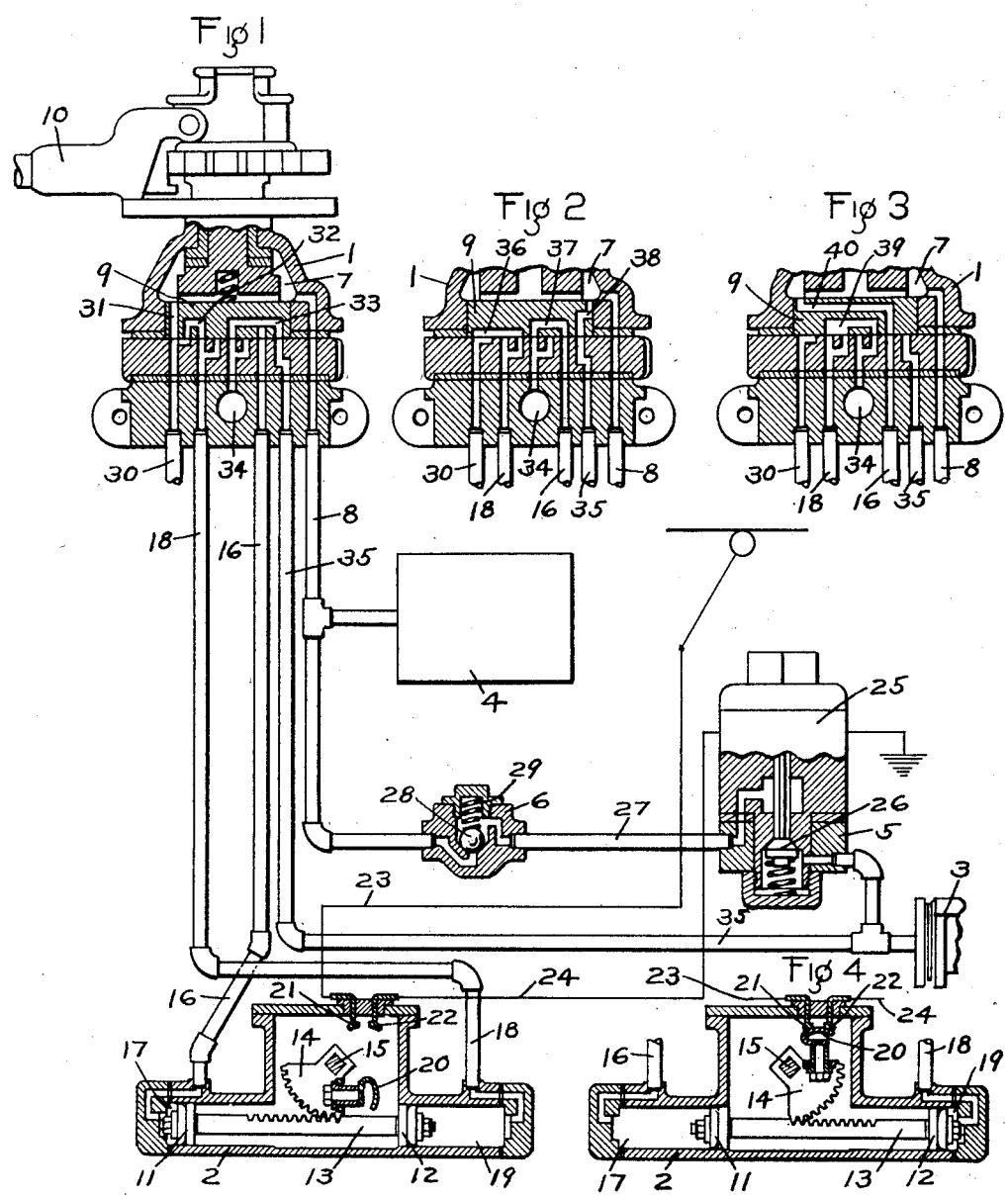
INVENTOR
JOSEPH C. McCUNE
BY Wm. M. Bady
ATTORNEY Patented Aug. 6, 1929.

1,723,192

UNITED STATES PATENT OFFICE.

JOSEPH C. McCUNE, OF EDGEWOOD, PENNSYLVANIA, ASSIGNOR TO THE WESTING-HOUSE AIR BRAKE COMPANY, OF WILMERDING, PENNSYLVANIA, A CORPORATION OF PENNSYLVANIA.

CAR-DOOR INTERLOCK.

Application filed May 19, 1928. Serial No. 278,995.

This invention relates to a fluid pressure apparatus for controlling the brakes and the car doors.

It has heretofore been proposed to provide a car door and brake controlling equipment comprising a brake valve device having a door opening position in which fluid under pressure is supplied to apply the brakes and is also supplied to a door engine to effect the opening of the car doors.

With the above equipment, the brake cylinder pressure will build up to the full pressure carried in the main reservoir if the brake valve is left in the door open position, and in order to avoid this and prevent the unnecessary waste of fluid under pressure, it has also been proposed to provide means for limiting the pressure of fluid supplied to the brake cylinder in the door open position of the brake valve. The brake valve device of this equipment is also provided with another position for applying the brakes without opening the car doors and in which the pressure in the brake cylinder may be built up as desired to the limit of pressure carried in the main reservoir.

In order to avoid a rough stop, it is necessary that the operator apply the brakes and then graduate the pressure down as the train approaches a stop and then in order to open the car doors, it is necessary to move the brake valve handle to the door open position after the car has actually been brought to a stop and in this position fluid under pressure is again supplied to the brake cylinder up to the pressure of the pressure limiting device.

The principal object of my invention is to provide an apparatus for controlling the car doors and the brakes in which fluid under pressure is not supplied to the brake cylinder in operating the apparatus to open the car doors until the car doors have been opened.

In the accompanying drawing; Fig. 1 is a diagrammatic view, mainly in section, of a car door and brake controlling equipment embodying my invention; Fig. 2 a sectional view of the brake valve device, showing the rotary valve in service brake application, doors closed position; Fig. 3 a sectional view of the brake valve device, showing the rotary valve in the door opening position; and Fig. 4 a sectional view of the door engine, shown in the door open position.

The equipment shown in the drawing comprises a brake valve device 1, a door engine 2, a brake cylinder 3, a main reservoir 4, a magnet valve device 5, and a pressure limiting valve device 6.

The brake valve device 1 may comprise a casing having a valve chamber 7 connected by pipe 8 to the main reservoir 4 and containing a rotary valve 9 adapted to be operated by a handle 10. The door engine 2 may comprise a casing having a piston cylinder containing pistons 11 and 12. The pistons 11 and 12 are connected together by a rack bar 13, a gear segment 14 being provided with teeth adapted to mesh with the teeth of the rack bar.

The gear segment 14 is adapted to operate a shaft 15, the rocking of which is adapted to operate mechanism for effecting the opening and closing of a car door. A pipe 16 leads from piston chamber 17 at one side of piston 11 to the seat of the rotary valve 9 and a pipe 18 leads from piston chamber 19 at one side of piston 12 to the seat of said rotary valve.

According to my invention, a contact member 20 is carried by the gear segment 14 and in the door opening position of the segment, the member 20 is adapted to bridge contact fingers 21 and 22. The finger 21 is connected to a source of current wire 23 and the contact finger 22 is connected to a wire 24 which leads to one terminal of a magnet 25 of the magnet valve device 5.

The magnet 25 is adapted to operate a valve 26 for controlling communication from a fluid pressure supply pipe 27, connected to the main reservoir 4, to the brake cylinder 3. The pressure limiting valve device 6 is interposed in the pipe 27 and comprises a ball check valve 28 which is urged to its seat by a spring 29.

For the sake of simplicity, certain units of the usual brake and door controlling equipment are not shown in the drawing, since the invention will be clearly understood without showing the complete working equipment. For example, the emergency brake pipe 30 is connected to an emergency valve device (not shown) which is adapted to operate upon a reduction in fluid pressure in the emergency brake pipe to supply fluid under pressure to the brake cylinder 3.

In the release position of the brake valve device, as shown in Fig. 1, the brake pipe 30 is connected through port 31 in the rotary valve with the valve chamber 7 and is also connected through cavity 32 in the valve, with the pipe 18, so that fluid under pressure is supplied to piston chamber 19 of the door engine 2. Pipe 16 is connected through cavity 33 in the rotary valve with an atmospheric exhaust port 34, so that piston chamber 17 is at atmospheric pressure, and the pistons 11 and 12 are held in the position shown in Fig. 1, in which the gear segment 14 is positioned to hold the car door closed. In this position, the contact member 20 is out of engagement with the contact fingers 21 and 22, so that the magnet 25 remains deenergized.

In the release position, the straight air pipe 35 is connected through cavity 33 in the rotary valve 9 with exhaust port 34, so that the brake cylinder 3 is at atmospheric pressure.

If the operator wishes to effect a service application of the brakes, without opening the car doors, he moves the brake valve handle 10 to service position, doors closed, as shown in Fig. 2. In this position, the emergency brake pipe 30 remains connected to the door closing pipe 18, through cavity 36 in the rotary valve, and the door opening pipe 16 is connected to the exhaust port 34 through cavity 37.

The straight air pipe 35 is connected to the rotary valve chamber 7, through port 38, so that fluid under pressure is supplied to the brake cylinder 3 to effect a service application of the brakes. If it is desired to open the car doors, the brake valve is turned to the position shown in Fig. 3. In this position, the door closing pipe 18 is connected, through cavity 39 with exhaust port 34, while the door opening pipe 16 is connected, through port 40 with the rotary valve chamber 7.

Fluid under pressure being then supplied through pipe 16 to piston chamber 17, the pistons 11 and 12 are shifted to the right to the position shown in Fig. 4, so as to effect the opening of the car doors.

It will be noted that in the door opening position of the brake valve device, the straight air pipe 35 is lapped, so that in this position, fluid under pressure is not supplied to the brake cylinder. When the door engine moves to the door opening position, the movement of the gear segment 14 causes the contact member 20 to bridge the contact fingers 21 and 22.

Current is then supplied to energize the magnet 25, so that the valve 26 is unseated and fluid under pressure is permitted to flow from the pipe 27 to the brake cylinder 3. The pressure of fluid supplied to the brake cylinder 3, however, is limited by the action of the check valve 28, which seats when the brake cylinder pressure has been increased sufficiently to permit the spring 29 to close the valve.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a brake cylinder, of a door engine and means operated upon movement of the door engine to the position for opening the car doors for supplying fluid under pressure to the brake cylinder.

2. The combination with a brake cylinder, of a device for effecting the opening and closing of a car door and means operated by the movement of said device to the door opening position for supplying fluid under pressure to the brake cylinder.

3. The combination with a brake cylinder, of electrically controlled means for controlling the supply of fluid under pressure to the brake cylinder, a mechanism operative to effect the opening and closing of a car door, and means operated by said mechanism for controlling said electrically controlled means.

4. The combination with a brake cylinder, of electrically controlled means operated upon energization to effect the supply of fluid under pressure to the brake cylinder, a door engine for effecting the opening and closing of a car door, and means operated upon movement of said door engine to the door opening position, for effecting the energization of said electrically controlled means.

5. The combination with a brake cylinder, of mechanism for effecting the opening and closing of a car door, means operated upon movement of said mechanism to effect the opening of a car door for supplying fluid under pressure to the brake cylinder, and means for limiting the pressure of fluid supplied to the brake cylinder by the first mentioned means.

6. The combination with a brake cylinder, of a door engine, a brake valve device for controlling the operation of said door engine and the supply of fluid under pressure to the brake cylinder and having one position in which the door engine is maintained in the door closing position and in which fluid under pressure is supplied to the brake cylinder, and another position in which the door engine is operated to effect the opening of a car door and in which fluid under pressure is not supplied to the brake cylinder, and means operated upon movement of said door engine to the door opening position for supplying fluid under pressure to the brake cylinder.

7. The combination with a brake cylinder, of a magnet valve device operated upon energization for effecting the supply of fluid under pressure to the brake cylinder, a mechanism for effecting the opening and closing of a car door, and a switch device operated upon movement of said mechanism to the position for opening a car door for closing a circuit to effect the energization of said magnet valve device.

In testimony whereof I have hereunto set my hand, this 16th day of May, 1928.

JOSEPH C. McCUNE.